(12) United States Patent
Vandenbaviere

(10) Patent No.: US 10,571,883 B2
(45) Date of Patent: Feb. 25, 2020

(54) ACTUATION DEVICE AND ASSOCIATED CONTROL AND MONITORING BOARD

(71) Applicant: SAFRAN ELECTRONICS & DEFENSE, Boulogne Billancourt (FR)

(72) Inventor: Yann Vandenbaviere, Boulogne Billancourt (FR)

(73) Assignee: SAFRAN ELECTRONICS & DEFENSE, Boulogne Billancourt (FR)

( * ) Notice: Subject to any disclaimer, the term of this patent is extended or adjusted under 35 U.S.C. 154(b) by 0 days.

(21) Appl. No.: 16/078,321

(22) PCT Filed: Feb. 28, 2017

(86) PCT No.: PCT/EP2017/054630
§ 371 (c)(1),
(2) Date: Aug. 21, 2018

(87) PCT Pub. No.: WO2017/157653
PCT Pub. Date: Sep. 21, 2017

(65) Prior Publication Data
US 2019/0056709 A1  Feb. 21, 2019

(30) Foreign Application Priority Data
Mar. 15, 2016 (FR) ...................... 16 52202

(51) Int. Cl.
*G05B 19/042* (2006.01)
*B64C 27/56* (2006.01)
*G05B 19/4062* (2006.01)
*G05B 23/02* (2006.01)

(52) U.S. Cl.
CPC .......... *G05B 19/0428* (2013.01); *B64C 27/56* (2013.01); *G05B 19/4062* (2013.01); *G05B 23/0208* (2013.01)

(58) Field of Classification Search
CPC ............ G05B 19/0428; G05B 19/4062; G05B 23/0208; B64C 27/56
USPC ......................................................... 701/3
See application file for complete search history.

(56) References Cited

U.S. PATENT DOCUMENTS

2003/0195673 A1* 10/2003 Foch ................. G05B 9/03
                                                                    701/3
2007/0033195 A1   2/2007 Stange et al.
2013/0338846 A1  12/2013 Meret et al.

FOREIGN PATENT DOCUMENTS

EP   2241948 A2  10/2010
EP   2293429 A2   3/2011

* cited by examiner

*Primary Examiner* — Brian P Sweeney
(74) *Attorney, Agent, or Firm* — Muncy, Geissler, Olds & Lowe, PC

(57) ABSTRACT

An actuator device including two actuators associated with command circuits and monitoring circuits that are segregated. A control and monitoring card. Calculation means.

4 Claims, 3 Drawing Sheets

ACTUATION DEVICE AND ASSOCIATED CONTROL AND MONITORING BOARD

FIELD OF THE INVENTION

The present invention relates to controlling actuators, and more particularly to controlling critical actuators.

BACKGROUND OF THE INVENTION

The flight controls of aircraft, and in particular of helicopters, are incorporating more and more electrical actuators, such as for example an electrohydraulic actuator for controlling the pitch of the blades of a rotor. A device for controlling such an electrohydraulic actuator conventionally comprises calculation means incorporating a control electronic card and a monitoring electronic card. The control electronic card transforms instructions from the pilot into an electrical setpoint that is sent via a wired control circuit to the actuator. The electrical setpoint results in the rod of the actuator being extended or retracted by a determined amount. The monitoring electronic card is connected by a wired monitoring circuit to a sensor for sensing movement of the actuator rod. On the basis of information from the control card and from the monitoring card, the calculation means set up a servocontrol loop in order to ensure proper operation of the command. Aviation safety standards require the use of resources that are distinct for processing information from the command card and for processing information from the monitoring card. Those requirements lead to making use of calculation means having two channels. A first channel processes information coming from and going to the control card, and the second channel processes information coming from and going to the monitoring card. This reduces the criticality of a failure of one of the two cards or of one of the two channels. Specifically, failure of one of the control elements (circuit or card) will be detected by the monitoring card, and failure of one of the elements of the monitoring circuit does not lead to loss of control of the actuator.

In order to make equipment compact, a control card frequently takes charge of controlling a plurality of actuators. Such a card generally has a plurality of processors, each connected to a respective control circuit that is dedicated to one respective actuator. Monitoring cards also comprise a plurality of processors, each connected to a respective monitoring circuit dedicated to one respective actuator.

Control devices having such a monitoring and control architecture are found to be reliable, but they represent a large amount of investment in terms of developing, fabricating, and maintaining each of their elements. The accumulated times for developing and fabricating each of the cards require expensive solutions to be deployed in order to satisfy the requirements of aircraft manufacturers for reactivity.

OBJECT OF THE INVENTION

An object of the invention is to reduce the costs of developing, fabricating, and/or maintaining an actuator device.

SUMMARY OF THE INVENTION

To this end, there is provided an actuator device comprising at least a first actuator and a second actuator that are provided with means for connecting them respectively to first and second control circuits and to the first and second monitoring circuits; and calculation means having two independent calculation channels, comprising:

a first control and monitoring card provided with a first control module and with a first monitoring module, and a second control and monitoring card provided with a second control module and with a second monitoring module, the cards being substantially identical. According to the invention, the first and second control modules are respectively connected to the first and second control circuits. The first monitoring module is connected to the second monitoring circuit and the second monitoring module is connected to the first monitoring circuit.

Thus, a single card performing distinct control and monitoring functions is used twice instead of control card arranged in parallel with a monitoring card, and without compromising the operating safety of the device. As a result only one card needs to be developed, thus making it possible to halve the resources needed for development compared with a control and monitoring architecture having two cards that are different. A single fabrication unit is needed for making the components of the calculation means, thereby achieving economies of scale and mobilising fewer production resources. Finally, maintenance is simplified, since it is no longer necessary to store both a control card and also a monitoring card, but only to store a single card. Agents for maintaining the system can be trained more quickly and more effectively since the training relates to a single card. Likewise, a smaller quantity of specific tooling is needed.

The term "substantially identical" or "identical" designates a hardware and software base that is common. For example, two cards that differ solely in the origins of the components they receive are "substantially identical" or "identical" in the meaning of the present application. The presence or the absence, on one of the cards of a pair of cards, of elements that are not essential for operation, such as for example connectors, ventilation, and/or indicator lights or buzzers of wired or wireless communications modules do not prevent those cards from being "substantially identical" in the meaning of the invention.

The invention also provides a control and monitoring card in which the control module has a first microcontroller and in which the monitoring module comprises a second microcontroller.

Advantageously, the control and monitoring card has a single programmable logic circuit reconfigured to provide a first logic array and a second logic array that are segregated and that correspond respectively to a control module and to a monitoring module.

Such a card makes it possible to use a single field programmable gate array (FPGA) for performing both the command function and the monitoring function of the card. In addition to the advantages made available by using an FPGA in terms of speed of deployment, creating two segregated circuits within a single FPGA improves the reliability of the card. The term "segregated" is used herein to mean strict physical separation without interaction.

The invention also provides calculation means having two independent calculation channels, a first calculation channel being provided with means for connection to a first control circuit and a first monitoring circuit, a second calculation channel being provided with means for connection to a second control circuit and a second monitoring circuit, the calculation means comprising:

a first control and monitoring card provided with a first control module and with a first monitoring module, and a second control and monitoring card provided with a second control module and with a second monitoring module, the cards being substantially identical;

the first control module and the second control module being for connection respectively to the first control circuit and to the second control circuit;

the first monitoring module being for connection to the second monitoring circuit; and the second monitoring module being for connection to the first monitoring circuit.

Other characteristics and advantages of the invention appear on reading the following description of particular, nonlimiting embodiments of the invention.

BRIEF DESCRIPTION OF THE DRAWINGS

Reference is made to the accompanying drawings, in which.

DETAILED DESCRIPTION OF THE INVENTION

Figure 1:
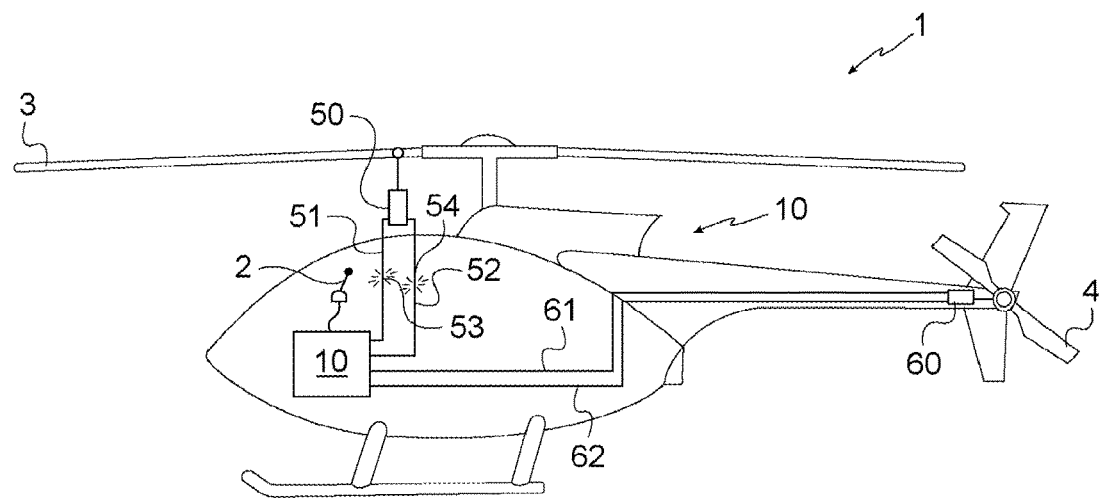
FIG. 1 is a diagrammatic view of the actuator device of the invention.
Figure 2:
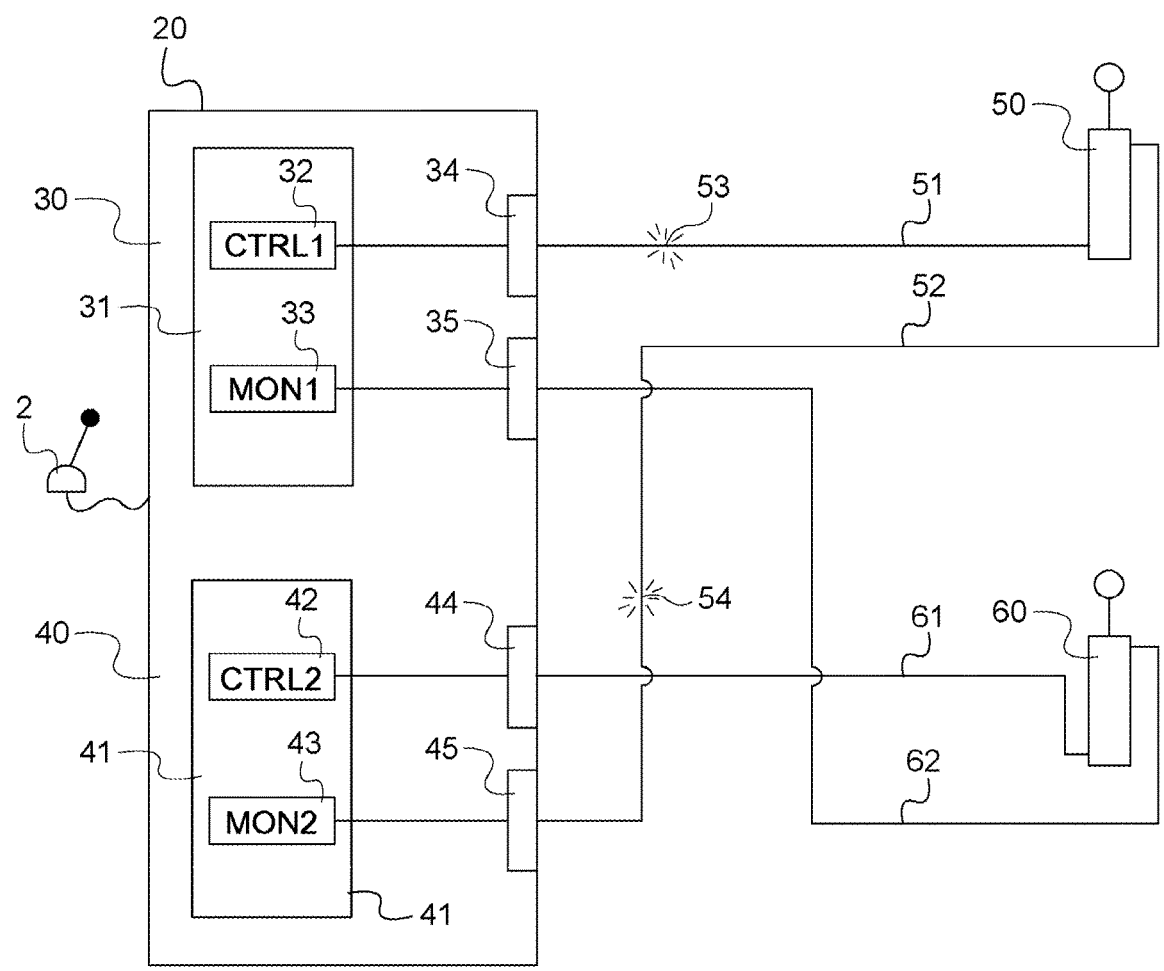
FIG. 2 is a diagrammatic view of a first embodiment of calculation means of the invention.

With reference to FIGS. 1 and 2, a helicopter—given overall reference 1—includes an actuator device 10 comprising calculation means 20 having two independent calculation channels 30 and 40 connected to a flight control 2. The calculation means 20 are connected to a first electric actuator 50 for adjusting the pitch of a main rotor 3 by means of a first control circuit 51 and a first monitoring circuit 52. The calculation means 20 are also connected to a second electric actuator 60 for adjusting the pitch of an anti-torque rotor 4 by means of a second control circuit 61 and a second monitoring circuit 62.

The first calculation channel 30 comprises a first control and monitoring card 31 provided with a first control module 32 and a first monitoring module 33.

The second calculation channel 40 comprises a second control and monitoring card 41 provided with a second control module 42 and a second monitoring module 43. In this example, the cards 31 and 41 are identical.

Figure 3:
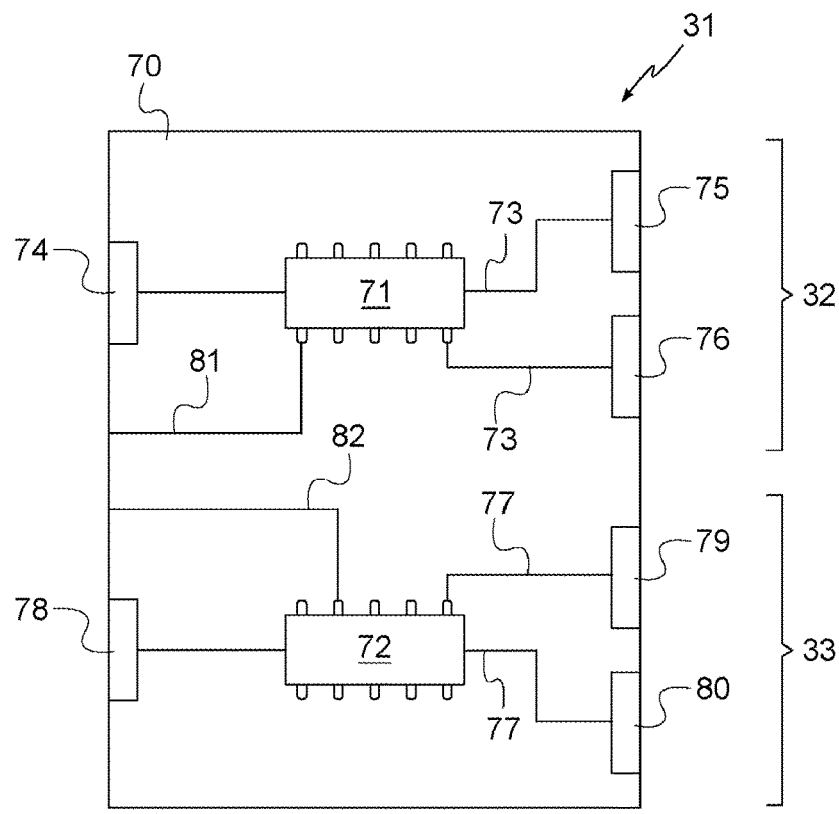
FIG. 3 is a diagrammatic view of a first embodiment of an electronic card of the invention.

With reference to FIG. 3, the card 31 comprises a printed circuit 70 receiving a first microcontroller 71 and a second microcontroller 72. The first microcontroller 71 is connected by printed circuit tracks 73 to two analog to digital converter (ADC) connectors 74 and 75 and also to an RJ45 connector 76. The second microcontroller 72 is connected by printed circuit tracks 77 to two ADC connectors 78 and 79 and also to an RJ45 connector 80. Respective printed circuit tracks 81 and 82 power the first and second microcontrollers 71 and 72 electrically. The unit constituted by the first microcontroller 71, its connectors 74-75 and 76, together with its electrical power supply 81 forms a first control module 32. The unit constituted by the second microcontroller 72, its connectors 78-79 and 80, together with its electrical power supply 82 forms a first monitoring module 33. The modules 32 and 33 are independent and they do not share any connection between them.

The first control module 32 is connected by a 35-pin connector 34 to the first control circuit 51. The second control module 42 is connected by a 35-pin connector 44 to the second control circuit 61.

The first monitoring module 33 is connected by a 35-pin connector 35 to the second monitoring circuit 62. The second monitoring module 43 is connected by a 35-pin connector 45 to the second monitoring circuit 52.

When the pilot of the helicopter 1 acts on the flight control 2 in order to modify the pitch of the main rotor 3, the first control module 32 of the first card 31 sends an electrical setpoint 53 to the first control circuit 51. The rod of the first actuator 50 then starts to move. The movement of the rod of the first actuator 50 is measured and transmitted in the form of an electrical signal 54 passing via the first monitoring circuit 52 to the second monitoring circuit 43 of the second card 41. The calculation means 20 then perform a servo control loop and stop sending the electrical setpoint 53 when the rod of the first actuator 50 reaches the position that corresponds to the instruction applied to the flight control 2 by the pilot. Thus, the first channel 30 of the calculation means 20 is in charge of controlling the first electric actuator 50 and the second channel 40 of the calculation means 20 is in charge of monitoring the electric actuator 50.

Similarly, the second control module 42 of the second card 41 of the second channel 40 of the calculation means 20 is in charge of controlling the second actuator 60. The first monitoring module 33 of the first card 31 of the first channel 30 of the calculation means 20 is in charge of monitoring the second actuator 60.

Calculation means 20 are thus obtained comprising two identical channels 30 and 40, while nevertheless conserving asymmetry between the control function and the monitoring function for a given actuator. Independence between the control and monitoring functions is achieved by the fact that these functions, for a given actuator, are not on the same channel of the calculation means 20. The calculation means 20 then satisfy the requirements for functions being independent and dissociated, thus making it possible to use two identical cards 31 and 41 having development, fabrication, and maintenance costs that are reduced compared with calculation means having one card dedicated to control and another card dedicated to monitoring.

In the description below of a second embodiment, elements identical or analogous to those described above are given numerical references augmented by one hundred.

Figure 4:
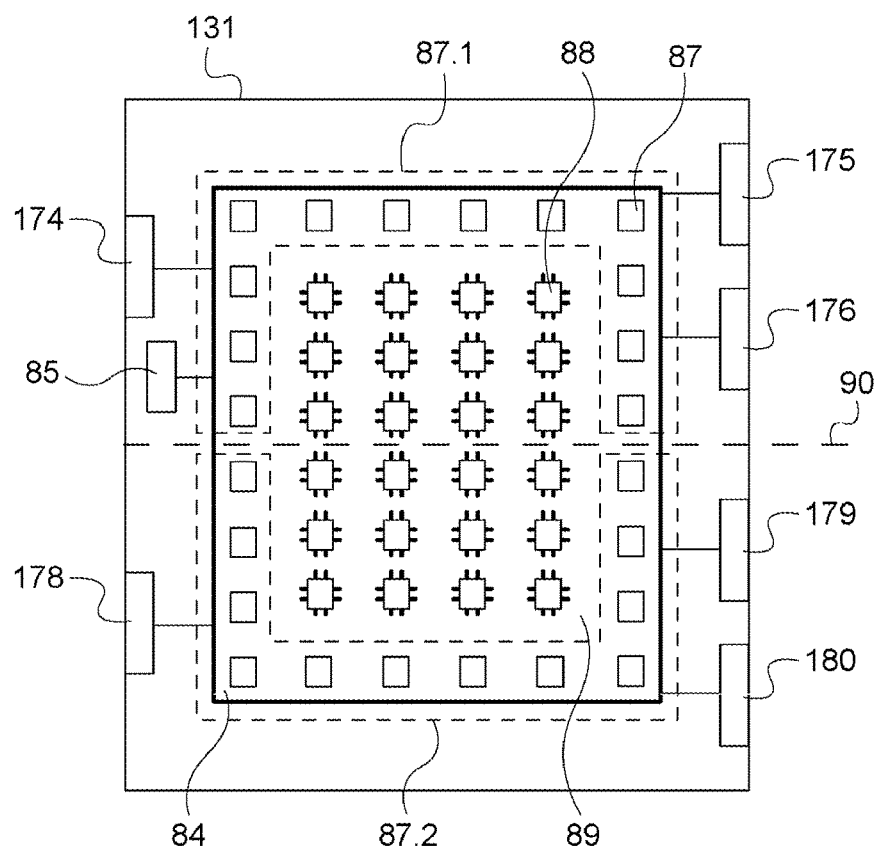
FIG. 4 is a diagrammatic view of a second embodiment of an electronic card of the invention.

With reference to FIG. 4, the first control and monitoring card 131 comprises: a conventional programmable logic circuit 84—also known as an FPGA; a power supply 85 connected to the programmable logic circuit 84; and connectors 174 to 176 and 178 to 180. The programmable logic circuit 84 includes a configurable circuit layer 86 and a static random access memory (SRAM) array layer (not shown). The periphery of the logic circuit 84 is provided with input/output blocks 87. In the invention, the programmable logic circuit 84 is configured to provide a first control logic array 88 and a first monitoring logic array 89. This configuration is performed by using a placement-and-routing tool to organize the logic blocks of the layer 86. As shown in FIG. 4, the programmable logic circuit 84 is segregated into two equivalent portions by a horizontal boundary 90 through which there pass no interconnections. The portion situated above the boundary 90 corresponds to the first control logic array 88 and the portion situated below the boundary 90 corresponds to the second monitoring logic array 89. This separation does not require any physical operation and appears in the reconfiguration of the programmable logic circuit 84 as stored in the memory array layer. The input/output blocks 87 are then subdivided into a first set 87.1 of input/output blocks and a second set 87.2 of input/output blocks, which sets are respectively connected to the first control logic array 88 and to the second monitoring logic array 89. The two logic arrays 88 and 89 involve distinct blocks of the programmable logic circuit 84, and this segregation is established during the initial configuration of the programmable logic circuit 84.

The connectors 174 to 176 are connected to the first set 87.1 of input/output blocks, while the connectors 178 to 180 are connected to the second set 87.2 of input/output blocks. The programmable logic circuit 84 is configured in such a manner that the first control logic circuit 88 performs the operations corresponding to the control module 132 of the electric actuator 150, while the first monitoring logic array 89 performs the operations corresponding to the monitoring module 133 of the electric actuator 160. The first set 87.1 of input/output blocks and the second set 87.2 of input/output blocks are respectively connected to the connectors 134 and 135.

Figure 5:
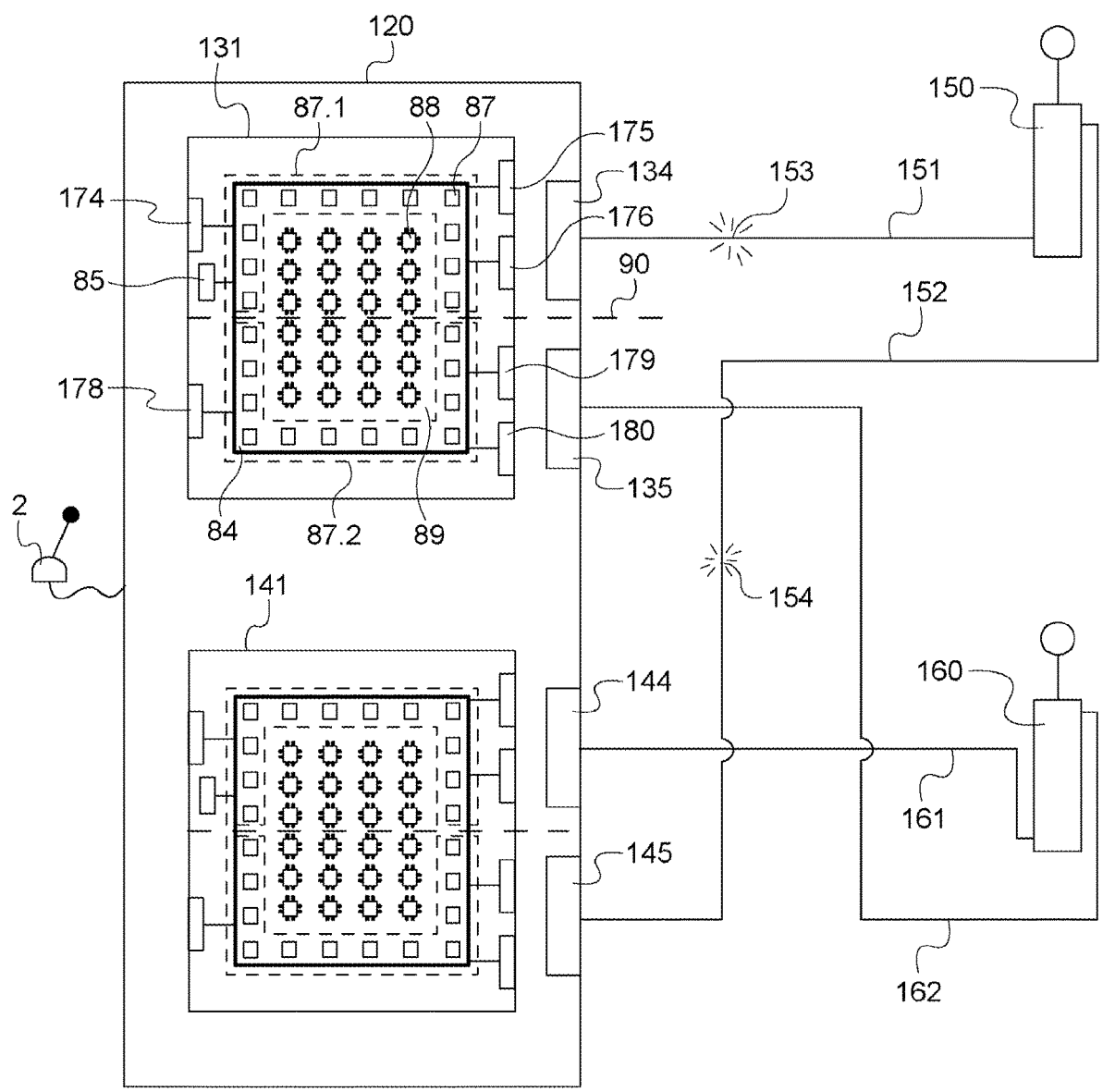
FIG. 5 is a diagrammatic view of a second embodiment of calculation means of the invention.

With reference to FIG. 5, calculation means 120 possess two channels 130 and 140 that comprise respectively the first control and monitoring card 131 and a second control and monitoring card 141, which is identical to the card 131.

The calculation means 120 are connected to a first electric actuator 150 for adjusting the pitch of a main rotor 3 by means of a first control circuit 151 and a first monitoring circuit 152. The calculation means 120 are also connected to a second electric actuator 160 for adjusting the pitch of an anti-torque rotor 4 by means of a second control circuit 161 and a second monitoring circuit 162.

In similar manner to the card 131, the second card 141 comprises a programmable logic circuit 94 segregated into a second control logic array 98 and a second monitoring logic array 99 respectively connected to a first set 97.1 of input/output blocks and to a second set 97.2 of input/output blocks. The first and second sets 97.1 and 97.2 of input/output blocks are respectively connected to connectors 144 and 145.

Each card 131 and 141 also has means for connection to the flight control 102.

The first control logic array 88 of the first card 131 is connected by the connector 134 to the first control circuit 151. The second control logic array 98 is connected by the connector 144 to the second control circuit 161.

The first monitoring logic array 89 is connected by a connector 135 to the second monitoring circuit 162. The second monitoring logic array 99 is connected by a connector 145 to the first control circuit 52.

Calculation means 120 are thus obtained comprising two identical channels 30 and 40, while nevertheless conserving asymmetry between the control function and the monitoring function for a given actuator. Independence between the control and monitoring functions is achieved by the fact that these functions, for a given actuator, are not on the same channel of the calculation means 120. The calculation means 120 thus satisfy the requirements for functions to be independent and dissociated in order to enable reduced criticality to be obtained while making use of two cards 131 and 141 that are substantially identical, for which development, fabrication, and maintenance costs are reduced compared with calculation means comprising two cards that are different.

Naturally, the invention is not limited to the embodiments described, but covers any variant coming within the ambit of the invention as defined by the claims.

In particular:

although in these examples the actuators are electrohydraulic control actuators for adjusting rotor pitch, the invention is equally applicable to other types of actuator, e.g. such as an actuator for deploying landing gear, for opening a hatch, for controlling a throttle, or for moving an aileron or a flap, or indeed actuators that are hydraulic or pneumatic;

although in these examples each microcontroller has two ADC connectors and one RJ45 connector, the invention applies equally to other types of control unit, such as for example a microprocessor optionally associated with random access memory (RAM) and/or read only memory (ROM), or a microcontroller having connectors of other types;

although in these examples the calculation means are connected by means of a 35-pin connector to the control or monitoring circuit, the invention applies equally to other ways of connecting the calculation means to the control and monitoring circuits, such as for example connectors having some other number of pins or connectors for serial or parallel connections;

although in these examples the actuators are connected to the control and monitoring circuits by wired connections, the invention applies equally to other ways of connecting the actuators to the control and monitoring circuits, such as for example a wireless connection or a connection via a single fieldbus;

although in these examples the programmable logic circuit is of the FPGA type, the invention applies equally to other types of programmable logic circuit, such as for example erasable programmable logic devices (EPLDs) provided with flash memory, or programmable array logic (PAL) using fusible interconnections; and although in these examples the invention is described in association with actuating two actuators, the invention is equally applicable to actuating more than two actuators.

The invention claimed is:

1. An actuator device comprising:
at least first and second actuators provided with connectors for connecting the at least first and second actuators respectively to first and second control circuits and to the first and second monitoring circuits; and
a calculation device having two independent calculation channels,
wherein the calculation device comprises:
a first control and monitoring card provided with a first control hardware module and with a first monitoring hardware module, and a second control and monitoring card provided with a second control hardware module and with a second monitoring hardware module, the first and second monitoring and control cards being identical;
the first and second control hardware modules being connected respectively to the first and second control circuits;
the first monitoring hardware module being connected to the second monitoring circuit; and
the second monitoring hardware module being connected to the first monitoring circuit.

2. The actuator device according to claim 1, wherein the first control hardware module and the second control hardware module each comprise a first microcontroller, and wherein the first monitoring hardware module and the second monitoring hardware each comprise a second microcontroller distinct from the first microcontroller.

3. The actuator device according to claim 1, wherein each control and monitoring card comprises a single programmable logic circuit configured to provide first and second logic arrays that are segregated, corresponding respectively to the control hardware module and to the monitoring hardware module.

4. A calculator having two independent calculation channels, provided with connector for connecting the calculator to at least first and second control circuits and to first and second monitoring circuits, the calculator comprising:
   a first control and monitoring card provided with a first control hardware module and with a first monitoring hardware module, and a second control and monitoring card provided with a second control hardware module and with a second monitoring hardware module, the first and second control and monitoring cards being identical;
   the first and second control hardware modules being for connection respectively to the first control circuit and to the second control circuit;
   the first monitoring hardware module being for connection to the second monitoring circuit; and
   the second monitoring hardware module being for connection to the first monitoring circuit.

* * * * *